(12) United States Patent
Peterik et al.

(10) Patent No.: US 9,905,208 B1
(45) Date of Patent: Feb. 27, 2018

(54) SYSTEM AND METHOD FOR AUTOMATICALLY FORMING A MASTER DIGITAL AUDIO TRACK

(71) Applicant: Speed of Sound Software, Inc., Pleasant Prairie, WI (US)

(72) Inventors: Colin James Peterik, Chicago, IL (US); Liam Hall Maxwell, Pleasant Prairie, WI (US)

(73) Assignee: Speed of Sound Software, Inc., Pleasant Prairie, WI (US)

( * ) Notice: Subject to any disclaimer, the term of this patent is extended or adjusted under 35 U.S.C. 154(b) by 0 days.

(21) Appl. No.: 15/437,595

(22) Filed: Feb. 21, 2017

(51) Int. Cl.
  *A63H 5/00* (2006.01)
  *G04B 13/00* (2006.01)
  *G10H 7/00* (2006.01)
  *G10H 1/00* (2006.01)

(52) U.S. Cl.
  CPC ......... *G10H 1/0025* (2013.01); *G10H 1/0008* (2013.01); *G10H 2210/066* (2013.01); *G10H 2210/091* (2013.01); *G10H 2210/125* (2013.01); *G10H 2210/145* (2013.01); *G10H 2220/126* (2013.01); *G10H 2250/305* (2013.01)

(58) Field of Classification Search
  CPC ............... G10H 1/0025; G10H 1/0008; G10H 2210/066; G10H 2210/091; G10H 2210/125; G10H 2210/145; G10H 2220/126; G10H 2250/305
  USPC .......................................................... 84/609
  See application file for complete search history.

(56) References Cited

U.S. PATENT DOCUMENTS

| | | | | |
|---|---|---|---|---|
| 5,952,598 A | * | 9/1999 | Goede | G06F 17/218 707/E17.009 |
| 9,653,095 B1 | * | 5/2017 | Tcheng | G10H 1/06 |
| 2014/0301573 A1 | * | 10/2014 | Kiely | G11B 27/031 381/119 |
| 2017/0148425 A1 | * | 5/2017 | Fraga | G10H 1/0025 |

* cited by examiner

*Primary Examiner* — Jeffrey Donels
(74) *Attorney, Agent, or Firm* — Kramer Levin Naftalis & Frankel LLP

(57) ABSTRACT

A method for automatically forming a master digital audio track is disclosed. A processing device of a digital audio workstation (DAW) may receive a plurality of audio tracks. For each audio track of a plurality of audio tracks, the processing device may place one or more split points at one or more locations on the audio track to produce a plurality of segments that are free of sudden changes in one or more properties of a waveform corresponding to the track. For each audio track of a plurality of audio tracks, the processing device may score each segment of the plurality of segments according to at least one of how closely a pitch of the corresponding waveform is in tune and a degree to which the waveform in the segment surpasses a pre-determined threshold of volume. The processing device may align the plurality of segments of each track of the plurality of audio tracks according to corresponding split points across the plurality of audio tracks. The processing device may select one or more best scoring segments from the plurality of aligned segments to produce a suggested master digital audio track. The processing device may present the suggested master digital audio track in an editing window of a monitor associated with the DAW.

26 Claims, 14 Drawing Sheets

SYSTEM AND METHOD FOR AUTOMATICALLY FORMING A MASTER DIGITAL AUDIO TRACK

TECHNICAL FIELD

Examples of the present disclosure relate to digital sound recording, and more particularly, to a system and a method for automatically forming a master digital audio track.

BACKGROUND

A digital audio workstation or DAW is an electronic device or computer software application for recording, editing, and producing audio files such as songs, musical pieces, human speech or sound effects. DAWs come in a wide variety of configurations from a single software program on a laptop, to an integrated stand-alone unit, all the way to a highly complex configuration of numerous components controlled by a central computer. DAWs have a central interface that allows the user to alter and mix multiple recordings and tracks into a final produced piece.

A DAW may refer to the audio editing software itself, but traditionally, a computer-based DAW has four basic components: a computer, either a sound card or audio interface, digital audio editor software, and at least one input device for adding or modifying data. This may be as simple as a mouse (if no external instruments are used) or as sophisticated as a piano-style MIDI controller keyboard or automated fader board for mixing track volumes.

The computer acts as a host for the sound card/audio interface, while the software provides the interface and functionality for audio editing. The sound card/external audio interface typically converts analog audio signals into digital form, and digital back to analog audio when playing it back; it may also assist in further processing of the audio. The software controls all related hardware components and provides a user interface to allow for recording, editing, and playback.

As software systems, DAWs are designed with many user interfaces, but generally they are based on a multitrack tape recorder metaphor, making it easier for recording engineers and musicians already familiar with using tape recorders to become familiar with the new systems. Therefore, computer-based DAWs tend to have a standard layout that includes transport controls (play, rewind, record, etc.), track controls and a mixer, and a waveform display. Single-track DAWs display only one (mono or stereo form) track at a time. The term "track" is still used with DAWs, even though there is no physical track as there was in the era of tape-based recording.

Multitrack DAWs support operations on multiple tracks at once. Like a mixing console, each track typically has controls that allow the user to adjust the overall volume, equalization and stereo balance (pan) of the sound on each track. In a traditional recording studio additional rackmount processing gear is physically plugged into the audio signal path to add reverb, compression, etc. However, a DAW can also route in software or use software plugins (or VSTs) to process the sound on a track.

There are countless software plugins for DAW software, each one coming with its own unique functionality, thus expanding the overall variety of sounds and manipulations that are possible. Some of the functions of these plugins include digital effects units which can modify a signal with distortion, resonators, equalizers, synthesizers, compressors, chorus, virtual amp, limiter, phaser, and flangers. Each have their own form of manipulating the soundwaves, tone, pitch, and speed of a simple sound and transform it into something different. To achieve an even more distinctive sound, multiple plugins can be used in layers, and further automated to manipulate the original sounds and mold it into a completely new sample.

Plugins, however, are limited in terms of flexibility and choices for changeable parameters. DAWs and DAW plugins currently do not permit the selection of a best audio performance from a set of audio performance take. Optimization of the selection of a best performance track is typically performed manually by a recording engineer. Unfortunately, a very skilled recording engineer spends about one hour for every minute of a song's length to try to get the perfect vocal take. The reason why it takes so long is that the recording engineer or the producer may have singers sing the same line of the song five, six, seven, eight, nine, ten different times. It is time consuming to perform multiple takes to obtain the bits and pieces that the recording engineer likes or are the most in-tune.

SUMMARY

The above-described problems are remedied and a technical solution is achieved in the art by providing a method and system for automatically forming a master digital audio track. A processing device of a digital audio workstation (DAW) may receive a plurality of audio tracks. The processing device may receive from a user an indication of an operation of a scan button in an editing window of a display of the DAW to cause the processing device to set one or more split points at one or more identified locations in each audio track of the plurality of audio tracks. For each audio track of a plurality of audio tracks, the processing device may place one or more split points at one or more locations on the audio track to produce a plurality of segments that are free of sudden changes in one or more properties of a waveform corresponding to the track. For each audio track of a plurality of audio tracks, the processing device may score each segment according to at least one of how closely a pitch of the corresponding waveform is in tune and a degree to which the waveform in the segment surpasses a pre-determined threshold of volume. The processing device may align the plurality of segments of each track of the plurality of audio tracks according to corresponding split points across the plurality of audio tracks. The processing device may select one or more best scoring segments from the plurality of aligned segments to produce a suggested master digital audio track. The processing device may present the suggested master digital audio track in an editing window of a monitor associated with the DAW.

Responsive to the processing device receiving an indication to compile a master digital audio track from the user, the processing device may visually stitch together the segments of the suggested master digital audio track into a final master digital audio track and display the final master digital audio track on the monitor. The processing device may receive from the user an indication to print the final master digital audio track to store the final master digital audio track in a memory.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which.

It is to be understood that the attached drawings are for purposes of illustrating the concepts of the invention and may not be to scale.

DETAILED DESCRIPTION

Examples of the present disclosure provide a method and system for automatically forming a master digital audio track. In an exemplary embodiment, the method can be a plug-in software component to a DAW called a segmentation optimizer. The segmentation optimizer is a software plug-in that permits music producers and sound engineers (hereinafter "user" or "users") to create professional and strikingly accurate vocal performances. By setting segmentation and detection parameters within the plugin, the user has complete control over the style and accuracy of the compilation, and the built-in editing window makes it easy for the user to fine tune, create crossfades, or override the chosen segments to create the vocal performance.

Figure 1:
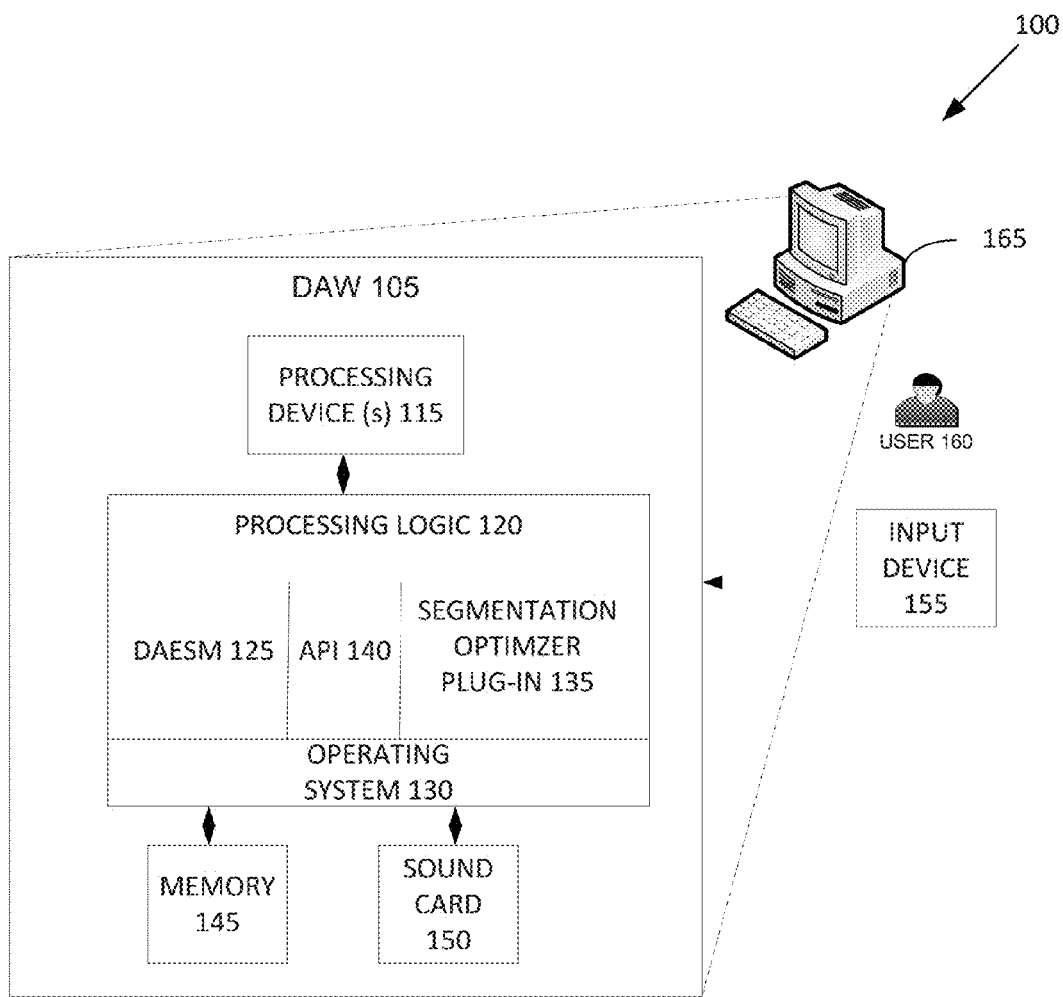
FIG. 1 is a block diagram of an exemplary system in which examples of the present disclosure may operate.

FIG. 1 is a block diagram of an exemplary system 100 in which examples of the present disclosure may operate. A DAW 105 residing on a computer may include a processing device 115. The DAW 105 may further include processing logic 120 which may include a digital audio editor software module 125 working in conjunction with an operating system 130. The processing logic 120 may further include the segmentation optimizer plug-in 135 configured to access and manipulate the digital editor audio software 125 through an application programming interface (API) 140. The DAW 105 may further include a memory 145, either a sound card 150 or an audio interface 150, and at least one input device 155 for adding or modifying data. The at least one input device 155 may be a mouse (if no external instruments are used) or a piano-style MIDI controller keyboard or automated fader board for mixing track volumes. A user 160 may interact with the DAW 105 using a monitor/keyboard 165 and the input device 155.

The DAW 105 acts as a host for the sound card/audio interface 150, while the segmentation optimizer plug-in 135 provides the interface and functionality for audio editing. The sound card/external audio interface 150 typically converts analog audio signals into digital form, converts digital back to analog audio when playing it back, and may also assist in further processing of the audio. The digital audio editor software module 125 and the segmentation optimizer plug-in 135 control all related hardware components and provides a user interface to allow for recording, editing, and playback.

Figure 2:
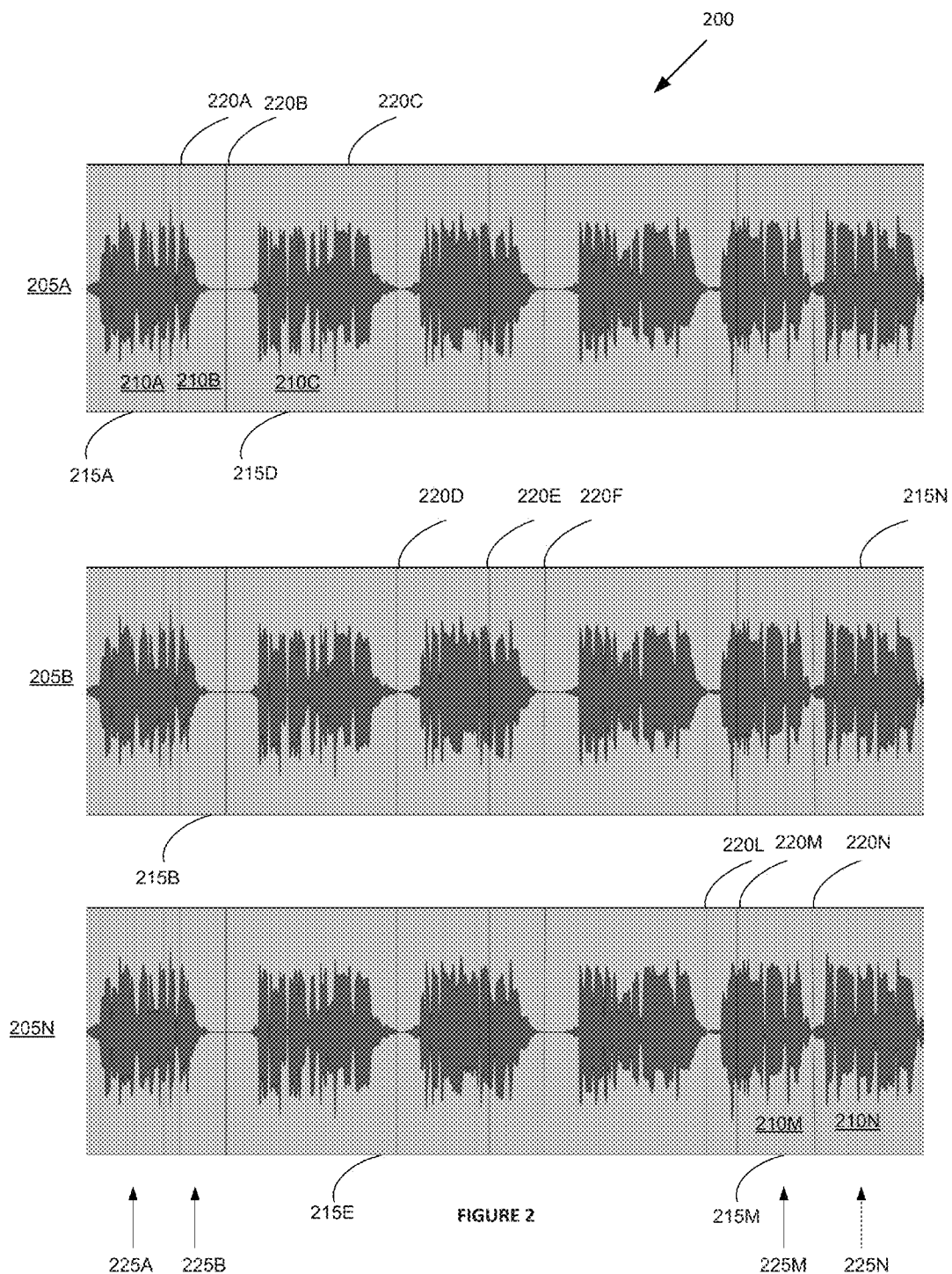
FIG. 2 shows a plurality of waveforms corresponding to a plurality of audio tracks divided into corresponding pluralities of segments with selections indicated for highest scoring segments that are to comprise a suggested complete master digital audio track.

FIG. 2 shows a plurality of waveforms 200 corresponding to a plurality of audio tracks 205a-205n, divided into corresponding pluralities of segments 210a-210n, with selections 215a-215n indicated for highest scoring segments that are to comprise a suggested complete master digital audio track. In one example, the segmentation optimizer plug-in 135 may receive a plurality of audio tracks 205a-205n representing multiple takes of a vocal portion of the same song produced by a singer. The segmentation optimizer plug-in 135 may receive from the user 160 an indication of an operation of a scan button in an editing window of the display 165 of the DAW 105 to cause the segmentation optimizer plug-in 135 to set one or more split points at one or more identified locations in each audio track of the plurality of audio tracks.

Each of these audio tracks 205a-205n of the same song is then segmented into a corresponding plurality of partial tracks or segments 210a-210n by the segmentation optimizer plug-in 135. The criteria used by the segmentation optimizer plug-in 135 for deciding where to place split points 220a-220n in each waveform corresponding to an individual audio track is to find locations that are free of sudden changes in one or more properties of the waveforms. The split points 220a-220n are optimally placed to avoid editing pops and unnatural transitions. The split points 220a-220n may include, but are not limited to, a rest (e.g., a moment of silence or a noise floor) or a point of sibilance (e.g., a point of high frequency in the waveform). A moment of sibilance corresponds to the utterance of certain high frequency consonants of sound by the singer. Rests (moments of silence) corresponding to the noise floor and moments of sibilance are points in the waveforms whose split points would be least noticeable to a listener, e.g., the listener would not hear a transition from one segment to the next segment. This process of segmentation is repeated for each of the plurality of audio tracks 205a-205n.

For each segment of each audio track 205a-205n, the segmentation optimizer plug-in 135 may grade or score each segment based on one or both of two criteria. One criteria is how closely the segment is in tune. Being in tune refers to how close that segment matches a selected key and corresponding scale of the key. A second criteria is a degree to which the amplitude of the peak values of corresponding waveform of the segment surpass a pre-defined threshold of volume.

The segmentation optimizer plug-in 135 may align the plurality of segments 210a-210n of each track of the plurality of audio tracks 205a-205n according to corresponding split points 220a-220n across the plurality of audio tracks 205a-205n. The segmentation optimizer plug-in 135 may select one or more best scoring segments from the plurality of aligned segments 225a-225n to produce a suggested master digital audio track. The processing device-may-present the suggested master digital audio track in an editing window of the monitor 165 associated with the DAW 105.

The user 160 may be permitted to edit and modify/override the automatically scored segments. The edited/overridden segments 210a-210n may be automatically and visually stitched together by the segmentation optimizer plug-in 135 into a proposed master digital audio track that is ready to be printed (stored in the memory 145) as a final master digital audio track in the memory 145.

Since the split points 220a-220n have already been selected on the monitor 165, the user 160 may apply crossfade to help smooth out the edited segments 210a-210n by fading out the end of a segment while simultaneously fading in the start of the next segment. Crossfades may be automatically applied within an edit window non-destructively (e.g., no new files are written; fade lengths can be toggled fade lengths). The auto-crossfade feature may be used in conjunction with cross-fading "by hand" within the edit window. Additionally, the user 160 may edit and fine tune the crossfade regions that the auto-cross fade feature applies to the edited segments 210a-210n.

The user 160 may further permitted to modify parameters within a graphical user interface (GUI) located on the monitor 165 associated with the DAW 105 to, for example, change the key and change the scale of a segment depending on the key and scale of the song associated with the segment, or change the root mean square (RMS) threshold value corresponding to volume/loudness. Responsive to the segmentation optimizer plug-in 135 receiving an indication to compile a master digital audio track from the user 160, the segmentation optimizer plug-in 135 may visually stitch together the segments of the suggested master digital audio track into a final master digital audio track and display the final master digital audio track on the monitor 165. The segmentation optimizer plug-in 135 may receive from the user 160 an indication to print the final master digital audio track to store the final master digital audio track in the memory 145.

Figure 3A:
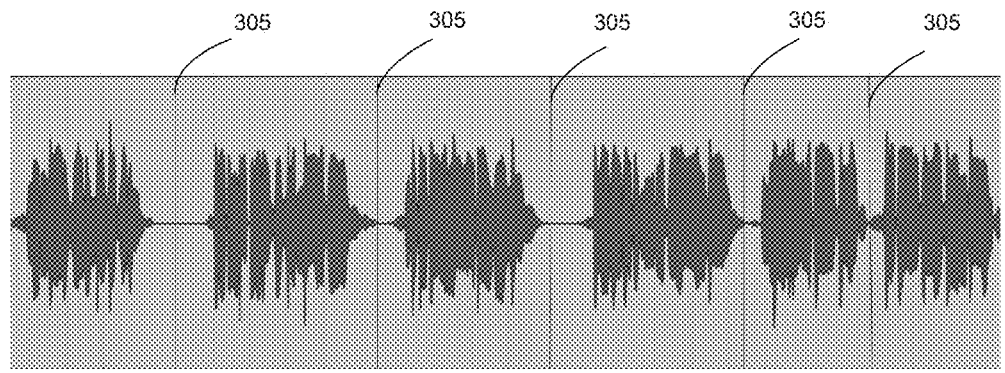
FIG. 3A is a graph of a sample audio waveform indicating a number of rest split points.

In order for the segmentation optimizer plug-in 135 to create natural sounding vocal performances without editing hiccups, as noted above, the segmentation optimizer plug-in 135 may scan a track for split points of two types: rest (a moment of silence) and sibilance (high frequency). A rest is the space between phrases, words, or syllables in a vocal performance. A moment of rest in an audio region is also known as the noise floor. If a crossfade is applied during a moment of rest near the noise floor, the split point may be completely undetectable by the listener. FIG. 3A is a graph of a sample audio waveform indicating a number of rest split points 305.

Figure 3B:
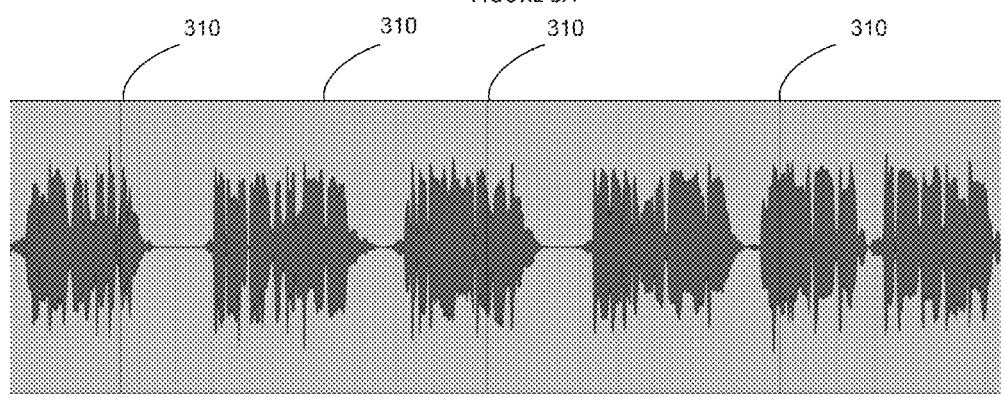
FIG. 3B is a graph of a sample audio waveform indicating a number of sibilance split points.
Figure 3C:
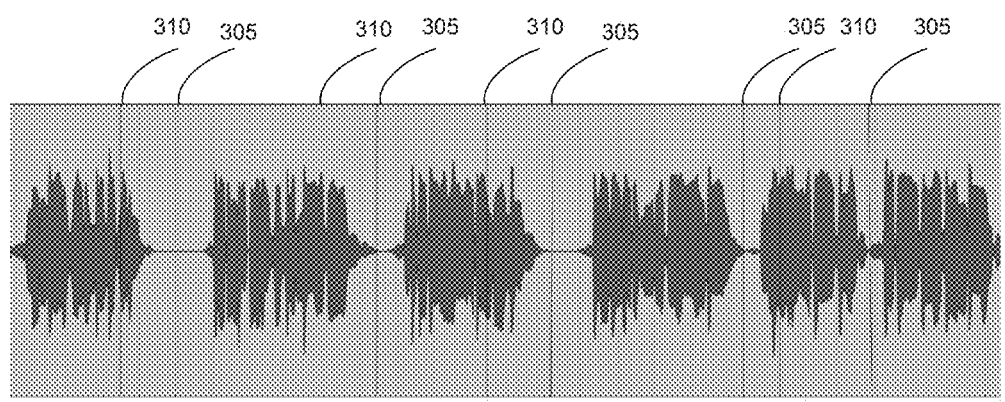
FIG. 3C is a graph of a sample audio waveform indicating a combination of the rest split points of FIG. 3A and the sibilance split points of FIG. 3B.

Sibilance is a set of consonants such as "Ss", "Sh" and "Ch" that commonly occur while singing. A moment of sibilance in a region of the digital audio waveform contains high-frequency information, often above 8 kHz, at or above which in frequency the waveform is moving that a sibilance split point will go by unnoticed by the listener. FIG. 3B is a graph of a sample audio waveform indicating a number of sibilance split points 310. A typical waveform of a trach may be marked with both parameters simultaneously. FIG. 3C shows the waveform of FIGS. 3A and 3B exhibiting the combination of rest split points 305 and sibilance split points 310.

Now that the track has been split into independent segments, the segmentation optimizer plug-in 135 may scan each segment based on two parameters: pitch accuracy and dynamic content. In one example, grading for pitch accuracy may be based on how in-tune a selected segment may be. Vocals convey the message of the song and are usually the most prominent part of any track, which means any mistakes are immediately obvious. Using built-in pitch recognition, the segmentation optimizer plug-in 135 may scan each segment corresponding to vocal performance for the best fitting segment based on parameters set by the user, such as key and scale. It should be noted that the segmentation optimizer plug-in 135 does not process or alter the original waveform in any way, thus leaving the natural shape of a vocal performance completely intact with no tuning artifacts.

The segmentation optimizer plug-in 135 may use a built in RMS detector to scan and grade for consistency in dynamic content, which can help create a vocal performance that is strong and deliberate, and may decrease the dependency on additional dynamic processors which can affect the natural vocal shape of the track. As noted above, grading dynamic content refers to the degree to which the amplitude of the peaks of the waveform in a segment surpass a user selectable threshold of volume. The user selectable threshold of volume may be based on a root mean square (RMS) value of the waveform compared against a preset threshold (e.g., low, medium, high; or soft, medium, loud). When the average level of the RMS value of the waveform surpasses the threshold, the segmentation optimizer plug in 135 may grade the segment as being higher than a segment that does not exceed the threshold. If many segments surpass the threshold, the segment having an average RMS value that exceeds the threshold most often or for the longest duration is assigned a higher score.

Figure 4:
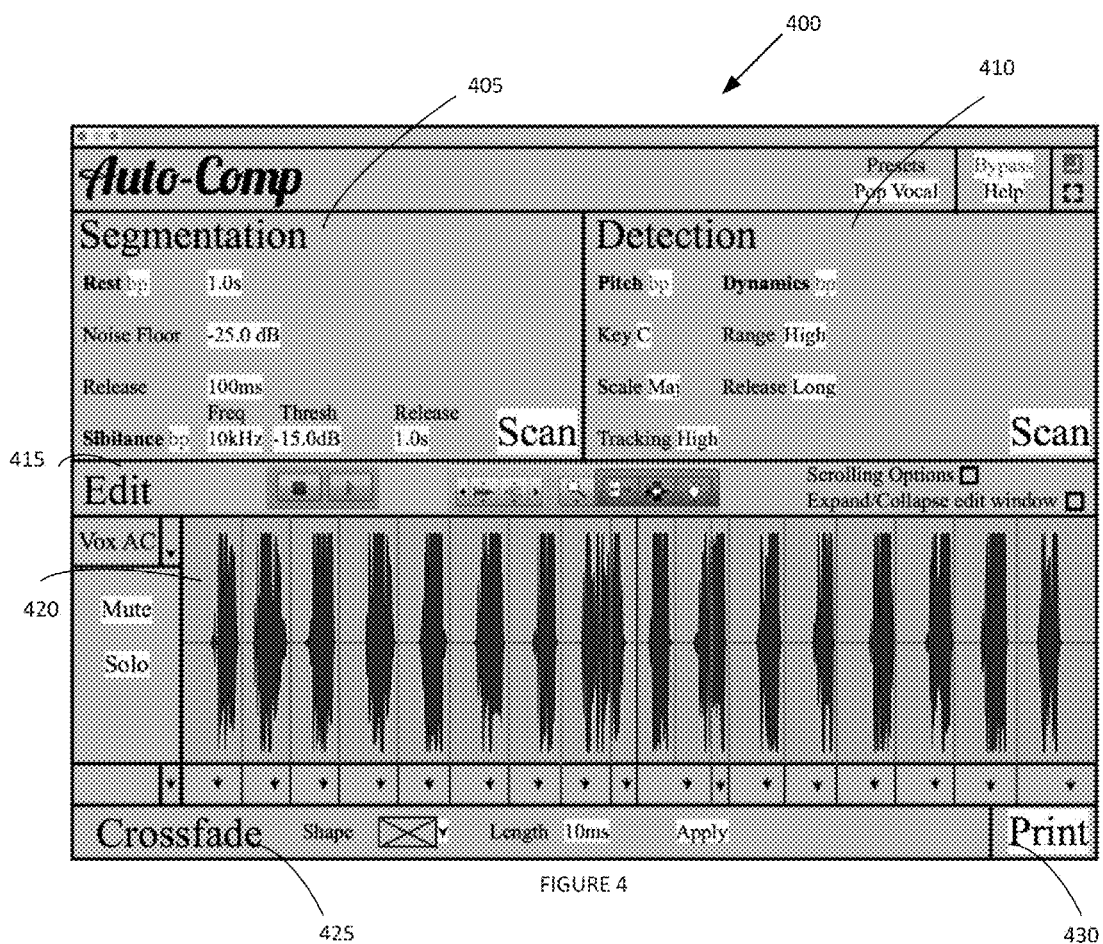
FIG. 4 is a screen shot of an example user interface edit window.

FIG. 4 is a screen shot of an example user interface edit window 400. The user interface edit window 400 may include a segmentation sub-window 405, a detection sub-window 410, and edit sub-window 415, one or more waveform sub-windows 420, a crossfade sub-window 425, and a print button 430 for committing a final master digital audio track to the memory 145. Once each track has been segmented and each segment has been detected, the segmentation optimizer plug-in 135 may build a master playlist of segmented tracks of the suggested master audio track in the user interface edit window 400 that displays chronological segments based on the in-tune and best dynamic content. The user interface edit window 400 operates in sync with a timeline of the associated digital audio editor software module 125 of the DAW 105, and contains a suite of advance playback functions that makes it easy to playback, mute, solo, nudge, drag, and zoom-in to carefully fine-tune vocals. Each segment displayed in the segmentation sub-window 405 has a dropdown menu that contains the next-best segments from top to bottom of aligned segments for a column of audio tracks. Selecting another segment from the dropdown menu places the segment into the suggested master digital audio track in the one or more waveform sub-windows 420. Suggested master digital audio tracks can be saved and renamed so the user 160 can easily switch between suggested tracks.

Once the vocal segments are selected and compiled into the suggested master digital audio track, the segmentation optimizer plug-in 135 may apply crossfades to split points based on parameters set by the user 160 in the crossfade sub-window 425, such as shape and length. Since split points have already been selected in the segmentation sub-window 405, the crossfade helps smooth out the edited segments by fading out the end of a segment while simultaneously fading in the start of the next segment. Once the crossfades have been applied, the edit sub-window 415 may be used for additional playback or editing of the placed crossfades.

Once the user 160 is happy with the vocal performance as a whole, selecting the print button 430 may save the entire suggested master digital audio track onto a final master digital audio track within the memory 145.

In the rendering of the user interface edit window 400, the user 160 may work from left to right, top to bottom. First, segmentation parameters are applied and scanned and displayed in the segmentation sub-window 405. The detection sub-window 410 is grayed out until segmentation has been scanned. Then, the detection sub-window 410 becomes live, permitting the user 160 to set detection parameters and scan each segment based on the parameters. As soon as detection has finished scanning, waveforms appear in the edit sub-window 415. When the user 160 is finished editing, cross-fades are applied at the bottom of the interface 400 in the crossfade sub-window 425.

Figure 5:
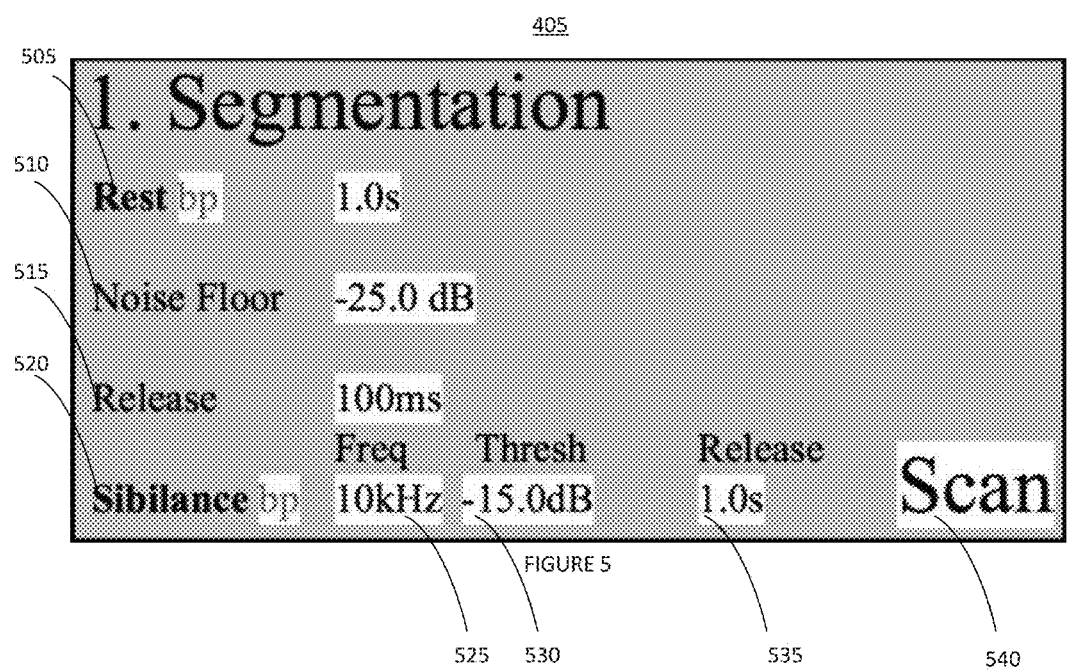
FIG. 5 is a screen shot of an example segmentation sub-window of a user interface edit window.

FIG. 5 is a screen shot of an example segmentation sub-window 405 of a user interface edit window 400. The user 160 may select in the segmentation sub-window 405 a rest value 505. The rest value 505 is the amount of time after the audio waveform of the track falls below the noise floor value before the track qualifies for segmentation. If the rest value 505 is selected by the user 160 to be of relatively short duration, the segmentation optimizer plug-in 135 may split regions between words and syllables in the waveform. If the rest value 505 is selected by the user 160 to be of relatively long duration, the segmentation optimizer plug-in 135 may split regions between phrases or sections in the waveform. The rest value 505 parameter of the segmentation window 405 can be bypassed or used in conjunction with the sibilance parameter 520.

Figure 6A:
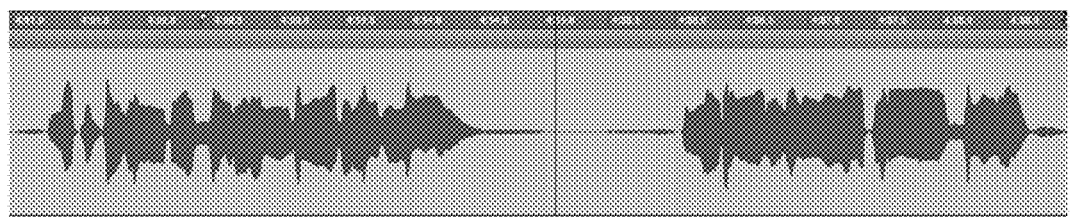
FIG. 6A is a graph of a sample audio waveform indicating a single segmentation based on a long rest value.
Figure 6B:
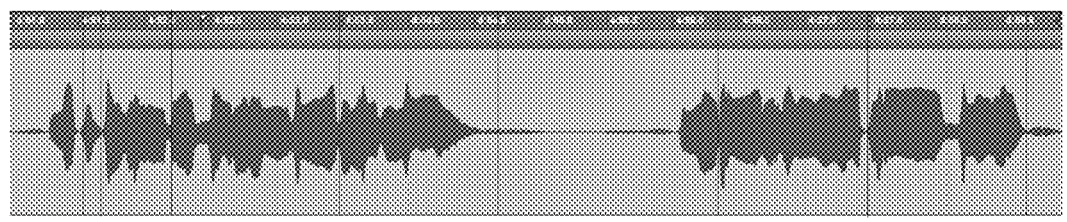
FIG. 6B is a graph of a sample audio waveform indicating a multiple segmentation based on a short rest value.

FIG. 6A is a graph of a sample audio waveform indicating a single segmentation based on a long rest value of 1 second. FIG. 6B is a graph of a sample audio waveform indicating a multiple segmentation based on a short rest value of 10 msec. The length of time used for rest detection may be based on how aggressive or relaxed the user wants the segmentation optimizer plug-in 135 to be. The length of time chosen may vary by, but is not limited to, singer, genre, or personal preference.

Figure 7A:
FIG. 7A is a graph of a sample audio waveform indicating a single segmentation based on a low noise floor.
Figure 7B:
FIG. 7B is a graph of a sample audio waveform indicating a multiple segmentation based on a high noise floor.

The parameter noise floor value 510, measured in dB, detects spaces in between vocal phrases. When the amplitude of the audio waveform of the track falls below the noise floor threshold value 510, a rest is detected. If the audio amplitude of the audio waveform stays below the noise floor threshold value 510 for longer than the rest value 505, the corresponding region of the waveform/track qualifies for segmentation. FIG. 7A is a graph of a sample audio waveform indicating a single segmentation based on a low noise floor. In FIG. 7A, since the noise floor threshold value 510 is set to a low value, the corresponding region of the waveform/track may be split once. FIG. 7B is a graph of a sample audio waveform indicating a multiple segmentation based on a high noise floor. In FIG. 7B, since the noise floor threshold value 510 is set to a high value, the corresponding region of the waveform/track may be split more frequently into multiple segments.

The parameter release value 515, typically measured in milliseconds, determines where the split point will be placed. The split point may be placed after the audio signal falls below the noise floor value 510 based on the release value 515. The release value 515 is used so that segmentation optimizer plug-in 135 does not inadvertently chop off the ends of a phrase that tapers off naturally.

The parameter sibilance 520, typically measured in kHz, refers to the sounds uttered when a person sings the high frequency consonants. The parameter sibilance 520 in the segmentation window 405 can be bypassed or used in conjunction with the parameter rest value 505. The parameter frequency 525, measured in Hertz, determines when sibilance occurs in the audio waveform of a track. The higher the frequency value, the fewer types of consonants may be detected as sibilance. For instance, with a high frequency value, such as 10 kHz, the segmentation optimizer plug-in 135 may detect "Ss" sounds, but may not detect less sibilant sound such as "F" and "J". With a lower frequency value, the segmentation optimizer plug-in 135 may begin to detect these less sibilant sounds.

Figure 8A:
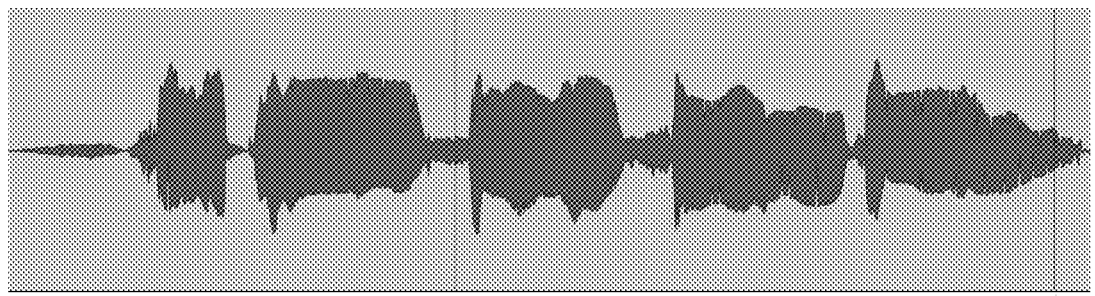
FIG. 8A is a graph of a sample audio waveform indicating segmentation based on a high frequency sibilance value.
Figure 8B:
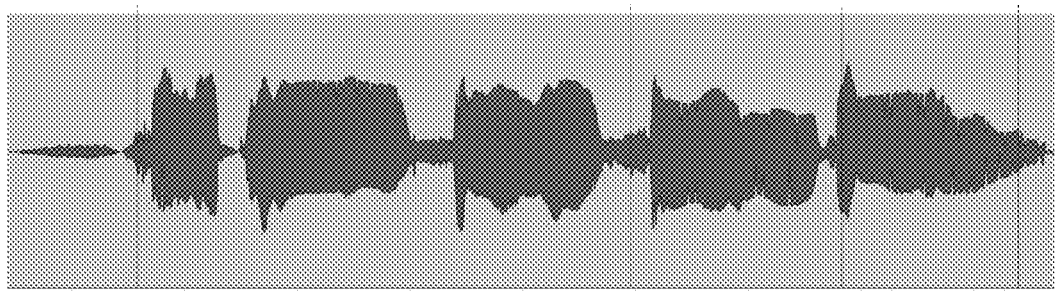
FIG. 8B is a graph of a sample audio waveform indicating a multiple segmentation based on a low frequency sibilance value.

FIG. 8A is a graph of a sample audio waveform indicating segmentation based on a high frequency sibilance value. In FIG. 8A, the frequency is set high at 10 kHz, therefore the "S" consonants are segmented. FIG. 8B is a graph of a sample audio waveform indicating a multiple segmentation based on a low frequency sibilance value. In FIG. 8B, the frequency is set lower at 2 kHz, so breathy and sharp consonants such as "H" and "T" are segmented as well as "S" consonants.

The parameter threshold 530, typically measured in dB, determines a level that the sibilance may surpass in order to be segmented. A split point is placed at the moment in the waveform that the parameter threshold 530 is surpassed. The parameter release 535, typically measured in seconds, is the time release before the segmentation optimizer plug-in 135 scans for more moments of sibilance. The parameter release 535 is needed to prevent multiple split points from being placed on the same instance of sibilance.

The scan button 540 causes the segmentation optimizer plug-in 135 to split each region of one or more audio waveforms corresponding to one or more tracks viewable in the edit sub-window 415 into multiple regions based on the user-selectable parameters within the segmentation sub-window 405.

Figure 9:
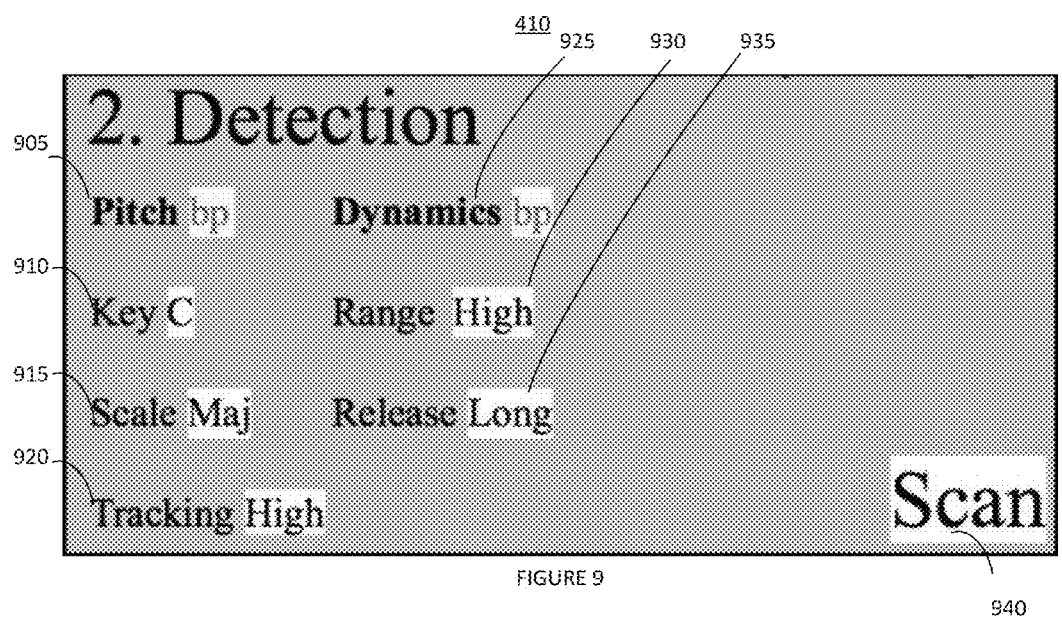
FIG. 9 is a screen shot of an example detection sub-window of a user interface edit window.

FIG. 9 is a screen shot of an example detection sub-window 410 of a user interface edit window 400. The detection sub-window 410 contains the categories pitch 905 and dynamics 925. Under the category pitch 905 are a parameter key value 910, a parameter scale value 915, and a parameter tracking value 920. Under the category dynamics 925 are the parameters range 930 and release 935. Pitch accuracy is one of the two criteria that the segmentation optimizer plug-in 135 relies on to build suggested master digital audio tracks of vocal performances. The goal of pitch accuracy is to find the most in-tune vocal segments. The category pitch 905 can be bypassed or used in conjunction with the dynamics category 925. The parameter key 910 selects among 12 semi-tone musical notes ranging from A to G#, which dictates the first note of the scale. The parameter scale 915 selecting between the chromatic, major, or minor scales, dictating the scale of the song or melody. The parameter tracking 920 selectable between high, medium, and low, is how strict or lenient the pitch detection may be when scanning a vocal.

Figure 10:
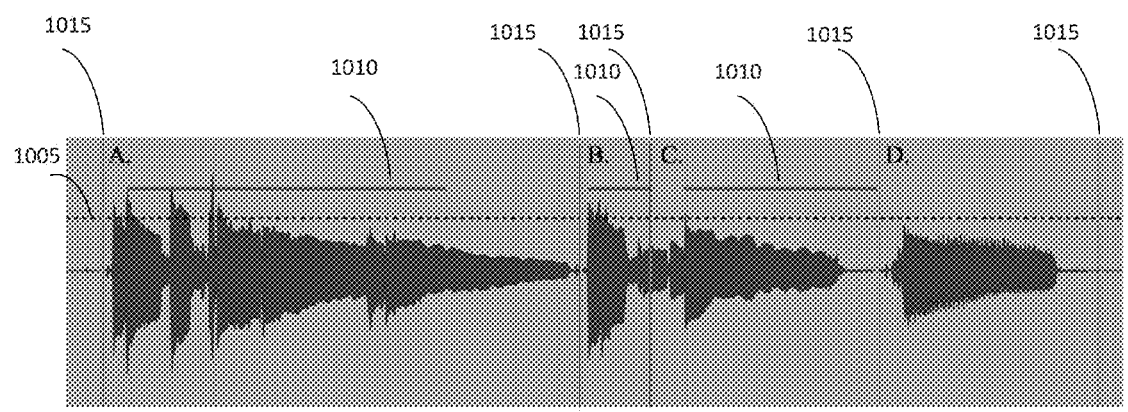
FIG. 10 is a graph of a sample audio waveform indicating multiple instances of segmentation based on range and release parameter levels.

FIG. 10 is a graph of a sample audio waveform indicating multiple instances of segmentation based on range and release parameter levels. Dynamic consistency is the other criteria that the segmentation optimizer plug-in 135 relies on to build suggested master digital audio tracks of vocal performances. The goal of this criteria is to find the most dynamically consistent vocal segments. This criteria can be bypassed or used in conjunction with the pitch accuracy criteria. The parameter range 930, selectable between high, medium, or low, is the RMS threshold that the audio volume may surpass in order to be detected as an acceptable volume. The parameter release, selectable between long, medium, and short, is the predefined length of time after the audio signal surpasses the range threshold that the segmentation optimizer plug-in 135 allows signals below the threshold to pass.

In FIG. 10, the dotted line 1005 represents the threshold level, the line 1010 represents the release length, and the lines 1015 represent the segments created during the segmentation process. In Segment A, the audio volume level surpasses the threshold level, but the release length runs out before the end of the segment. In Segment B and C, the audio volume level surpasses the threshold level and the release length last for the duration of the segment. Segment D does not surpass the threshold level and therefore it not detected. Of the four segments, only B and C meet the criteria set by the category dynamics 925 parameters.

Operating the scan button 940 causes the segmentation optimizer plug-in 135 to scan segments of one or more tracks and arrange them into a suggested master digital audio track based on the criteria set in the detection sub-window 410.

Figure 11:
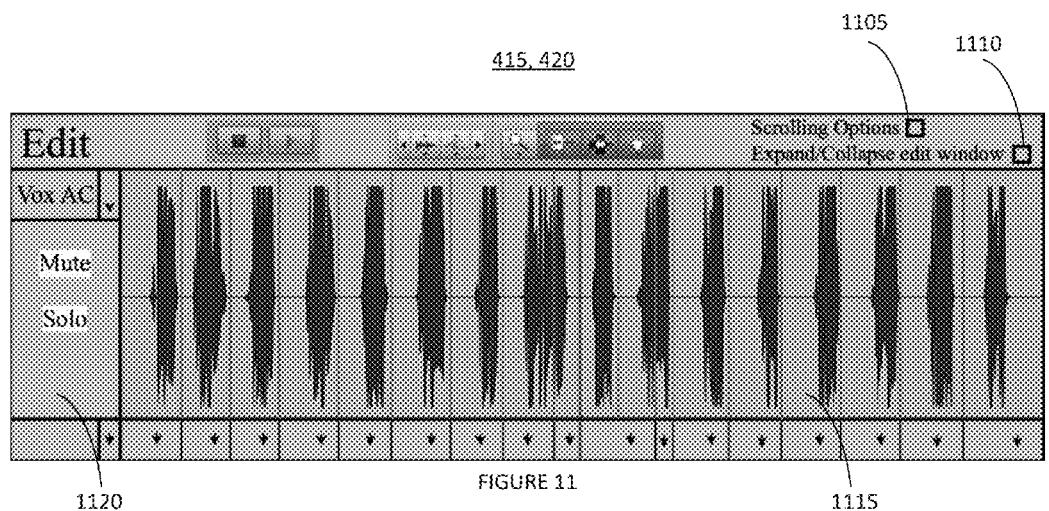
FIG. 11 is a screen shot of an example edit sub-window and one or more waveform sub-windows of a user interface edit window.

FIG. 11 is a screen shot of an example edit sub-window 415 and one or more waveform sub-windows 420 of a user interface edit window 400. The edit sub-window 415 and one or more waveform sub-windows 420 makes it possible for the user 160 to playback and edit compiled vocal segments within the segmentation optimizer plug-in 135 interface. The scrolling options dialogue box 1105 includes options page, continuous, and none views of the waveforms. The expand/collapse edit window button 1110 expands the edit sub-window 415 to the full size of the display 165 of the WAV 105.

When the segmentation optimizer plug-in 135 finishes its scan, the segments that best match the detection criteria may appear in a suggested master digital audio track 1115 on the display 165 of the WAV 105. The segmentation optimizer plug-in 135 scans and ranks identified segments from best match to worst match based on the detection criteria. There is a drop down menu below each segment that permits swapping one segment with another in the suggested master digital audio track 1115. The segments in the drop down menu are ordered best match to worst match, from top to bottom. By clicking the drop down menu next to the track name within the edit sub-window 415, playlists may be duplicated in order to save changes. This makes it easy for the user 160 to compare multiple playlists. By creating a suggested master digital audio track 1115, the segmentation optimizer plug-in 135 permits the user 160 to revert to the segmentation sub-window 405 and the detection sub-window 410 to adjust parameters, resulting in the creation of a new suggested master digital audio track with different criteria. The segmentation optimizer plug-in 135 permits the user 160 to playback and compare between these playlists, and even mix and match the suggested master digital audio tracks to create the best suggested master digital audio track for a song.

The mute/solo input 1120 permits muting or soloing the vocal track to hear what the song sounds like without the vocal, or what the vocal sounds like by itself, respectively.

Figure 12:
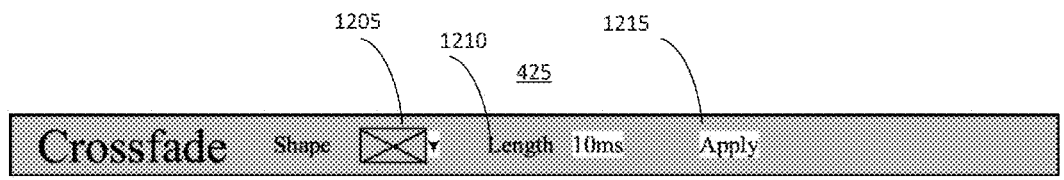
FIG. 12 is a screen shot of an example a crossfade sub-window of a user interface edit window.

FIG. 12 is a screen shot of an example a crossfade sub-window 425 of a user interface edit window 400. Crossfades can be applied to split points on the suggested master digital audio track in order to smooth out edit points and prevent any unwanted clicks or pops. A crossfade fades out the end of one segment while simultaneously fading in the start of the next segment. The crossfade sub-window 425 includes two parameters: shape 1205 and length 1210. The shape parameter 1205 is the shape of the waveform of the crossfade and is selectable between equal power, equal gain, and two types of parabolic curves. The length parameter 1210, typically indicated milliseconds, is the length of the crossfade. The length parameter 1210 by default is equal on each side of a split point. For instance, if the length 1210 is set to 10 ms, the crossfade may begin 5 ms before the end of a segment and end 5 ms after the start of the next segment. When crossfades are applied to the suggested master digital audio track, the segmentation optimizer plug-in 135 permits nudging, dragging, or stretching the crossfades to sound smoother.

The apply button 1215 applies crossfades to the plurality of split points on the suggested master digital audio track based on the shape parameter 1205 and the length parameter 1210. Alternatively, crossfades may be applied manually within the user interface edit window 400.

Pressing print 430 on the lower right corner of the user interface edit window 400 may consolidate the master playlist onto a new track within the memory 145 associated with the DAW 105. If it is not desirable to commit the vocal performance, segmentation optimizer plug-in 135 can run in the background on the new track without the need to print.

Figure 13:
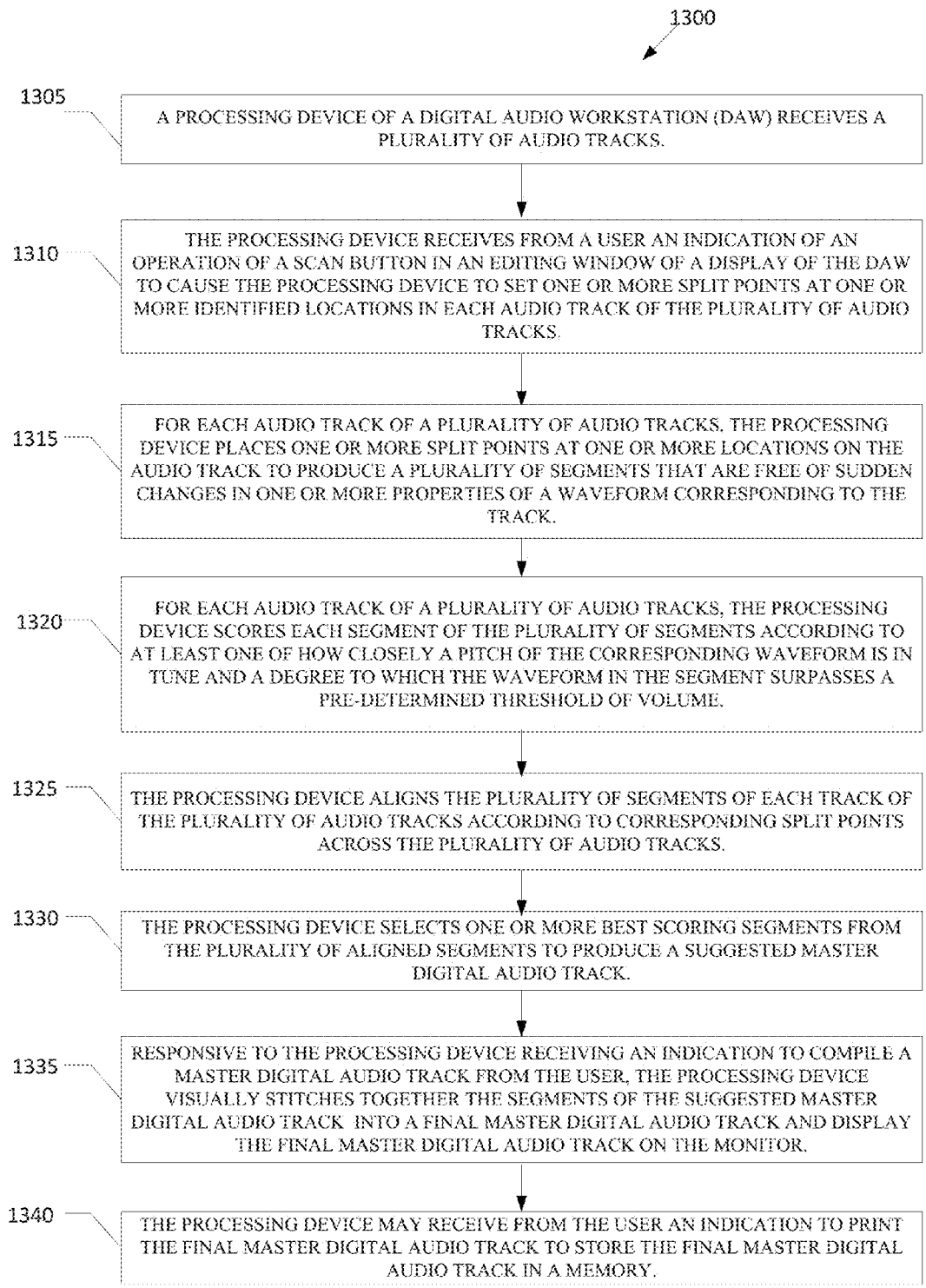
FIG. 13 is a flow diagram illustrating an example of a method for a processing device to automatically form a master digital audio track.

FIG. 13 is a flow diagram illustrating an example of a method 1300 for automatically forming a master digital audio track. The method 1300 may be performed by a processing device 115 of the DAW 105 of FIG. 1 and may comprise hardware (e.g., circuitry, dedicated logic, programmable logic, microcode, etc.), software (e.g., instructions run on a processing device), or a combination thereof. In one example, the method 1300 may be performed by the segmentation optimizer plug-in 135 associated with a processing device 115 of the DAW 105 of FIG. 1.

As shown in FIG. 13, at block 1305, the segmentation optimizer plug-in 135 of a digital audio workstation (DAW) 105 may receive a plurality of audio tracks 205a-205n. At block 1310, the segmentation optimizer plug-in 135 may receive from a user 160 an indication of an operation of a scan button in an editing window of a display 165 of the DAW 105 to cause the segmentation optimizer plug-in 135 to set one or more split points 220a-220n at one or more identified locations in each audio track of the plurality of audio tracks 205a-205n. At block 1315, for each audio track of a plurality of audio tracks 205a-205n, the segmentation optimizer plug-in 135 may place one or more split points 220a-220n at one or more locations on the audio track to produce a plurality of segments 210*a*-210*n* that are free of sudden changes in one or more properties of a waveform corresponding to the track.

The one or more properties of the waveform may be a moment of rest in the waveform. The moment of rest corresponds to a noise floor of the waveform. The noise floor may contain one or more zero-point crossings of the waveform. The noise floor may be selectable based on a rest value corresponding to the amount of time after the waveform of the track falls below the noise floor before a track qualifies for segmentation. A split point may be selectable based on a release value of the noise floor corresponding to a point in time after the amplitude of the waveform falls below the noise floor.

The one or more properties of the waveform may be a point of sibilance in the waveform. The point of sibilance may correspond to a human utterance of a high frequency consonantal sound in the waveform. A location of a split point may be selectable based on a frequency threshold of the sibilance. A location of a split point may be selectable based on a release parameter corresponding to a time before the processing device scans for more moments of sibilance. At block 1320, for each audio track of a plurality of audio tracks 205*a*-205*n*, the segmentation optimizer plug-in 135 may score each segment of the plurality of segments 210*a*-210*n* according to at least one of how closely a pitch of the corresponding waveform is in tune and a degree to which the waveform in the segment surpasses a pre-determined threshold of volume. In an example, the segmentation optimizer plug-in 135 scoring each segment may include the segmentation optimizer plug-in 135 summing a score of a segment based on how in tune the segment is to the selected musical key and the degree to which the one or more amplitudes of the peaks of the waveform in the segment surpass the pre-determined threshold of volume.

A degree to which the waveform in the segment surpasses a pre-determined threshold of volume is based on a degree to which the one or more amplitudes of the peaks of the waveform in the segment surpass the pre-determined threshold of volume. The threshold of volume may be based on a root mean square (RMS) value of the waveform compared against a preset threshold. Responsive to the average level of the RMS value of the waveform exceeding the threshold, the segmentation optimizer plug-in 135 may score a first segment of the plurality of segments 210*a*-210*n* as being higher than a second segment of the plurality of segments 210*a*-210*n* that does not exceed the threshold. Responsive to two segments of the plurality of segments surpassing the threshold, the segmentation optimizer plug-in 135 may score each of the two segments in an order based on how often or how long a segment has an average RMS value that exceeds the threshold. The RMS threshold may be selectable according to a range parameter, wherein the range parameter corresponds to the RMS threshold that the audio volume is to surpass in order to be detected as an acceptable volume. The RMS threshold may be selectable according to a release parameter, wherein the ratio of the release parameter to the length of time after the waveform of a track surpasses the range threshold that the processing device allows signals below the threshold to pass.

In an example, how closely a pitch of a corresponding waveform of a segment is in tune is based on how closely the pitch matches a selected musical key and corresponding scale. Scoring based how closely a pitch of the corresponding waveform is in tune may be selectable according to one or more of a selected key, a selected scale, or a tracking parameter corresponding to how strict or lenient a pitch may deviate from the selected key and the selected scale.

At block 1325, the segmentation optimizer plug-in 135 may align the plurality of segments 210*a*-210*n* of each track of the plurality of audio tracks 205*a*-205*n* according to corresponding split points across the plurality of audio tracks 205*a*-205*n*. At block 1330, the segmentation optimizer plug-in 135 may select one or more best scoring segments from the plurality of aligned segments 225*a*-225*n* to produce a suggested master digital audio track. At block 1335, the segmentation optimizer plug-in 135 may present the suggested master digital audio track in an editing window of a monitor associated with the DAW.

At block 1340, responsive to the segmentation optimizer plug-in 135 receiving an indication to compile a master digital audio track from the user 160, the segmentation optimizer plug-in 135 may visually stitch together the segments of the suggested master digital audio track into a final master digital audio track and display the final master digital audio track on the monitor 165. At block 1345, the segmentation optimizer plug-in 135 may receive from the user 160 an indication to print the final master digital audio track to store the final master digital audio track in the memory 145.

The segmentation optimizer plug-in 135 may permit the user 160 to swap one best scoring segment of one audio track with lower scoring segment of another audio track from a drop-down menu of a column of the plurality of columns of segments 225*a*-225*n* displayed on the monitor 165. The segmentation optimizer plug-in 135 may permit the user 160 to duplicate a suggested master audio track to adjust parameters, resulting in the creation of a new master digital audio track with different criteria.

When there is a tie in a score of two corresponding segments of two different audio tracks, the segmentation optimizer plug-in 135 may select a segment from an earlier recorded audio track to be included in the suggested master digital audio track.

Figure 14:
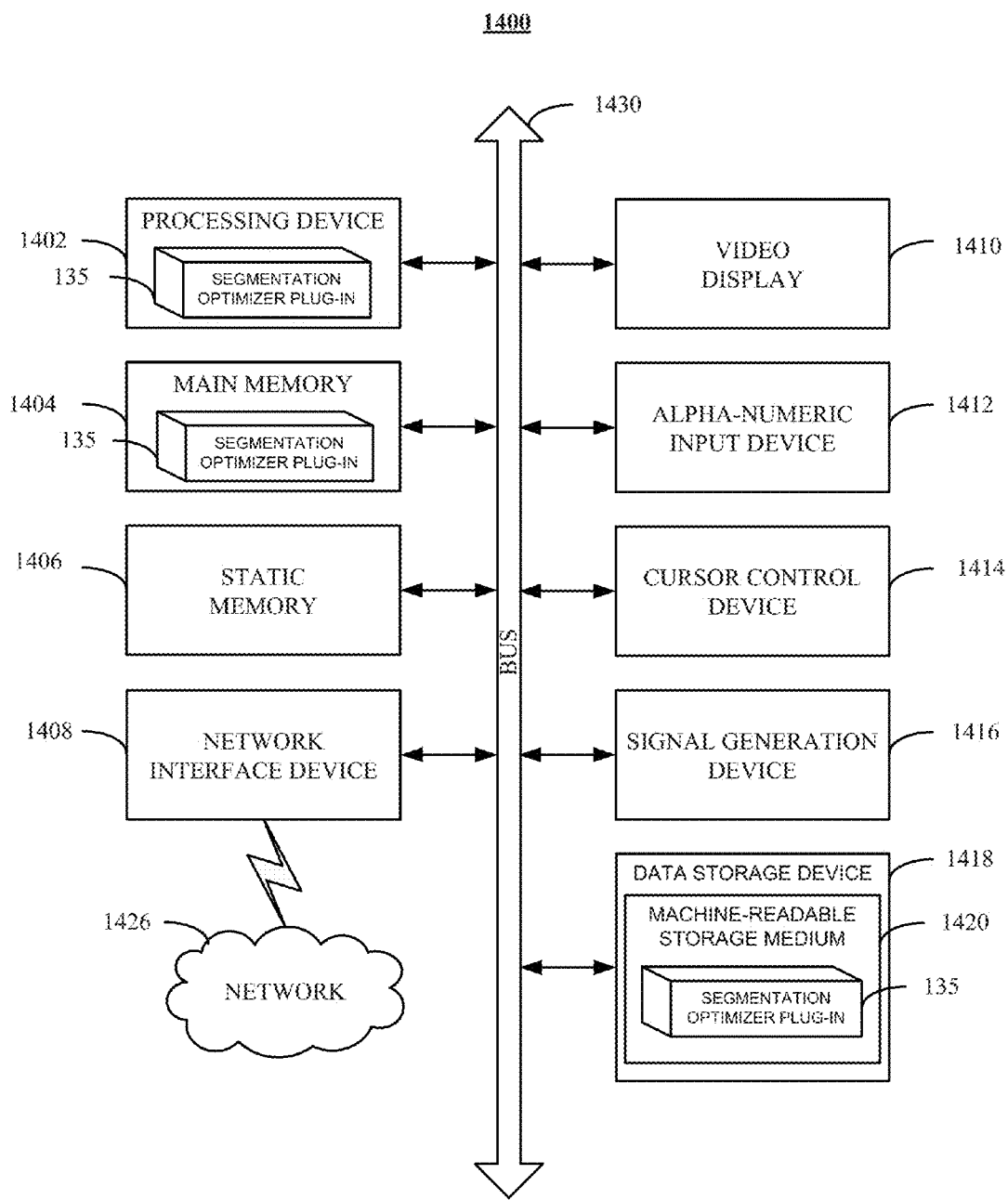
FIG. 14 illustrates a diagrammatic representation of a machine in the exemplary form of a computer system within which a set of instructions, for causing the machine to perform any one or more of the methodologies discussed herein, may be executed.

FIG. 14 is a diagrammatic representation of a machine in the exemplary form of a computer system 1400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1400 includes a processing device 1402, a main memory 1404 (e.g., read-only memory (ROM), flash memory, dynamic random access memory (DRAM) (such as synchronous DRAM (SDRAM) or Rambus DRAM (RDRAM), etc.), a static memory 1406 (e.g., flash memory, static random access memory (SRAM), etc.), and a data storage device 1418, which communicate with each other via a bus 1430.

Processing device 1402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. Processing device 1402 is configured to execute the segmentation optimizer plug-in 135 for performing the operations and steps discussed herein.

Computer system 1400 may further include a network interface device 1408. Computer system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), and a signal generation device 1416 (e.g., a speaker).

Data storage device 1418 may include a machine-readable storage medium (or more specifically a computer-readable storage medium) 1420 having one or more sets of instructions embodying any one or more of the methodologies of functions described herein. The segmentation optimizer plug-in 135 may also reside, completely or at least partially, within main memory 1404 and/or within processing device 1402 during execution thereof by computer system 1400; main memory 1404 and processing device 1402 also constituting machine-readable storage media. The segmentation optimizer plug-in 135 may further be transmitted or received over a network 1426 via network interface device 1408.

Machine-readable storage medium 1420 may also be used to store the processing logic 145 persistently. While machine-readable storage medium 1420 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method for automatically forming a master digital audio track, comprising:
   receiving a plurality of audio tracks;
   for each audio track of a plurality of audio tracks:
      placing, by a processing device of a digital audio workstation (DAW), one or more split points at one or more locations on the audio track to produce a plurality of segments, one or more properties of a waveform corresponding to the track at the one or more locations satisfying at least one predetermined condition; and scoring each segment of the plurality of segments according to at least one of how closely a pitch of the corresponding waveform is in tune and a degree to which the waveform in the segment surpasses a pre-determined threshold of volume;

aligning the plurality of segments of each track of the plurality of audio tracks according to corresponding split points across the plurality of audio tracks;

selecting one or more best scoring segments from the plurality of aligned segments to produce a suggested master digital audio track; and presenting the suggested master digital audio track in an editing window of a monitor associated with the DAW.

2. The method of claim 1, wherein the one or more properties of the waveform is amplitude of the waveform.

3. The method of claim 2, wherein the at least one predetermined condition is satisfied when the amplitude falls below a noise floor of the waveform, resulting in a moment of rest in which the waveform is imperceptible to a user.

4. The method of claim 3, further comprising determining, for each audio track of the plurality of audio tracks, whether the audio track qualifies for segmentation based on a rest value corresponding to the amount of time after the waveform of the track falls below the noise floor.

5. The method of claim 3, further comprising selecting at least one of the one or more split points for placement based on a release value corresponding to a point in time after the amplitude of the waveform falls below the noise floor.

6. The method of claim 1, wherein the one or more properties of the waveform is frequency of the waveform.

7. The method of claim 6, wherein the at least one predetermined condition is satisfied when a human utterance of a high frequency consonantal sound occurs in the waveform, resulting in a point of sibilance.

8. The method of claim 7, further comprising selecting at least one of the one or more split points for placement based on a frequency threshold of the sibilance.

9. The method of claim 7, further comprising selecting at least one of the one or more split points for placement based on a release parameter corresponding to a time before the processing device scans for more moments of sibilance.

10. The method of claim 1, wherein a degree to which the waveform in the segment surpasses a pre-determined threshold of volume is based on a degree to which the one or more amplitudes of the peaks of the waveform in the segment surpass the pre-determined threshold of volume.

11. The method of claim 1, wherein the threshold of volume is based on a root mean square (RMS) value of the waveform compared against a preset threshold.

12. The method of claim 11, further comprising:
responsive to the average level of the RMS value of the waveform exceeding the threshold,
scoring a first segment of the plurality of segments as being higher than a second segment of the plurality of segments that does not exceed the threshold.

13. The method of claim 11, further comprising:
responsive to two segments of the plurality of segments surpassing the threshold,
scoring each of the two segments in an order based on how often or how long a segment has an average RMS value that exceeds the threshold.

14. The method of claim 11, wherein the RMS threshold is selectable according to a range parameter, wherein the range parameter corresponds to the RMS threshold that the audio volume is to surpass in order to be detected as an acceptable volume.

15. The method of claim 11, wherein the RMS threshold is selectable according to a release parameter, wherein the ratio of the release parameter to the length of time after the waveform of a track surpasses the range threshold that the processing device allows signals below the threshold to pass.

16. The method of claim 1, wherein, how closely a pitch of the corresponding waveform is in tune is based on how closely the pitch matches a selected musical key and corresponding scale.

17. The method of claim 1, wherein scoring based on how closely a pitch of the corresponding waveform is in tune is selectable according to one or more of a selected key, a selected scale, or a tracking parameter corresponding to how strict or lenient a pitch may deviate from the selected key and the selected scale.

18. The method of claim 1, further comprising:
receiving, from a user, an indication of an operation of a scan button in the editing window to cause the processing device to set the one or more split points at the one or more locations in each audio track of the plurality of audio tracks.

19. The method of claim 1, further comprising,
responsive to an receiving an indication from a user to compile a master digital audio track,
visually stitching together the segments of the suggested master digital audio track into a final master digital audio track; and
displaying the final master digital audio track on the monitor.

20. The method of claim 19, further comprising:
receiving from the user an indication to print the final master digital audio track to store the final master digital audio track in a memory.

21. The method of claim 1, further comprising permitting a user to swap one best scoring segment of one audio track with lower scoring segment of another audio track from a drop-down menu of a column of the plurality of columns of segments displayed on the monitor.

22. The method of claim 1, further comprising:
permitting a user to duplicate a suggested master audio track to adjust parameters, resulting in the creation of a new master digital audio track with different criteria.

23. The method of claim 1, wherein scoring each segment includes summing a score of a segment based on how in tune the segment is to a selected musical key and a degree to which the one or more amplitudes of the peaks of the waveform in the segment surpass the pre-determined threshold of volume.

24. The method of claim 1, wherein when there is a tie in a score of two corresponding segments of two different audio tracks,
selecting a segment from an earlier recorded audio track to be included in the suggested master digital audio track.

25. A system for automatically forming a master digital audio track, comprising:
a memory; and
a processing device of a digital audio workstation (DAW), coupled to the memory, to:
receive a plurality of audio tracks;
for each audio track of a plurality of audio tracks:
place one or more split points at one or more locations on the audio track to produce a plurality of segments, one or more properties of a waveform corresponding to the track at the one or more locations satisfying at least one predetermined condition; and score each segment of the plurality of segments according to at least one of how closely a pitch of the corresponding waveform is in tune and a degree to which the waveform in the segment surpasses a pre-determined threshold of volume;

align the plurality of segments of each track of the plurality of audio tracks according to corresponding split points across the plurality of audio tracks;

select one or more best scoring segments from the plurality of aligned segments to produce a suggested master digital audio track; and present the suggested master digital audio track in an editing window of a monitor associated with the DAW.

26. A non-transitory computer readable storage medium including instructions that, when executed by a processing device of a digital audio workstation (DAW), cause the processing device to automatically form a master digital audio track, the processing device further to:

receive a plurality of audio tracks;

for each audio track of a plurality of audio tracks:

place one or more split points at one or more locations on the audio track to produce a plurality of segments, one or more properties of a waveform corresponding to the track at the one or more locations satisfying at least one predetermined condition; and score each segment of the plurality of segments according to at least one of how closely a pitch of the corresponding waveform is in tune and a degree to which the waveform in the segment surpasses a pre-determined threshold of volume;

align the plurality of segments of each track of the plurality of audio tracks according to corresponding split points across the plurality of audio tracks;

select one or more best scoring segments from the plurality of aligned segments to produce a suggested master digital audio track; and present the suggested master digital audio track in an editing window of a monitor associated with the DAW.

* * * * *